United States Patent
Henning et al.

(10) Patent No.: US 6,908,285 B2
(45) Date of Patent: Jun. 21, 2005

(54) METHODS AND APPARATUS FOR ASSEMBLING ROTATABLE MACHINES

(75) Inventors: Thomas Richard Henning, Cincinnati, OH (US); Gert J. van der Merwe, Monroe, OH (US); William Carl Ruehr, Cincinnati, OH (US); Daniel Edward Mollmann, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 91 days.

(21) Appl. No.: 10/409,392

(22) Filed: Apr. 8, 2003

(65) Prior Publication Data

US 2004/0202544 A1 Oct. 14, 2004

(51) Int. Cl.[7] ............................................. B63H 1/00
(52) U.S. Cl. ................... 416/144; 416/219 R; 416/500; 29/889.21
(58) Field of Search ............................. 416/144, 219 R, 416/500; 29/889.2, 889.21, 889.22

(56) References Cited

U.S. PATENT DOCUMENTS

| | | | |
|---|---|---|---|
| 3,888,601 A | | 6/1975 | Glassburn |
| 3,894,324 A | * | 7/1975 | Holzapfel et al. ......... 29/889.2 |
| 4,213,736 A | | 7/1980 | Gongwer |
| 4,253,800 A | | 3/1981 | Segawa et al. |
| 4,602,412 A | * | 7/1986 | Partington et al. ....... 29/889.22 |
| 4,732,532 A | | 3/1988 | Schwaller et al. |
| 4,767,272 A | | 8/1988 | Kildea |
| 4,971,641 A | * | 11/1990 | Nelson et al. ................. 156/64 |
| 6,290,466 B1 | * | 9/2001 | Ravenhall et al. ...... 416/229 A |

FOREIGN PATENT DOCUMENTS

| | | |
|---|---|---|
| EP | 0962660 A | 12/1999 |
| EP | 1085172 A | 3/2001 |
| EP | 1382858 A | 1/2004 |
| GB | 2245661 A | 1/1992 |

* cited by examiner

*Primary Examiner*—Hoang Nguyen
(74) *Attorney, Agent, or Firm*—William Scott Andes; Armstrong Teasdale LLP

(57) ABSTRACT

A method and apparatus for assembling a rotatable machine is provided. The machine includes a plurality of blades that extend radially outwardly from a rotor. The method includes determining a moment weight of each blade in a row of blades, determining a geometric parameter of each blade in the same row of blades, and determining a mapping order of each blade using the moment weight and the geometric parameter. The apparatus includes a computer system that includes a software product code segment for minimizing imbalance in a bladed rotor wherein the segment is configured to receive a moment weight value for each blade to be installed in said rotor, receive a geometric parameter value for each blade to be installed in said rotor, calculate a blade location on the rotor based on the received values, and generate a blade map based on the calculated location.

20 Claims, 3 Drawing Sheets

METHODS AND APPARATUS FOR ASSEMBLING ROTATABLE MACHINES

BACKGROUND OF THE INVENTION

This invention relates generally to gas turbine engines and, more particularly, to assembling rotating components of gas turbine engines.

At least some known gas turbine engines include a core engine having, in serial flow arrangement, a fan assembly and a high pressure compressor which compress airflow entering the engine. A combustor ignites a fuel-air mixture which is then channeled through a turbine nozzle assembly towards low and high pressure turbines which each include a plurality of rotor blades that extract rotational energy from airflow exiting the combustor. Gas turbines are used in different operating environments, such as, to provide propulsion for aircraft and/or to produce power in both land-based and sea-borne power systems.

During normal operation gas turbine engines may experience high rotational speeds. An imbalance of the rotor may cause vibration of the rotor and induce stresses to rotor bearings and support structures. Over time, continued operation with such stresses may lead to failure of the bearings, bearing support structure, and/or rotor components. Failure of a component within the engine system may damage the system and/or other components within the system, and may require system operations be suspended while the failed component is replaced or repaired. More particularly, when the component is a turbofan gas turbine engine fan blade, a blade-out condition may cause damage to a blade that is downstream from the released blade.

At least some known turbofan gas turbine engines include a fan base having a plurality of fan blades extending radially outwardly therefrom. To facilitate minimizing imbalance of the fan during operation, known fan assemblies are assembled in a controlled manner. For example, one control that may be used in assembling fan rotors is mapping each blade of the fan into specific slots in the fan base. Within other known fan assemblies a moment weight of each blade is determined and the determined moment weight is used to map each blade into specific fan base slots. However, because the geometry of adjacent blades may be different, during operation a rotor may still experience a shift in balance that is not associated with the moment weight of each blade.

BRIEF DESCRIPTION OF THE INVENTION

In one aspect, a method of assembling a rotatable machine is provided. The machine includes a plurality of blades that extend radially outwardly from a rotor. The method includes determining a moment weight of each blade in a row of blades, determining a geometric parameter of each blade in the same row of blades, and determining a mapping order of each blade using the moment weight and the geometric parameter.

In another aspect, a rotor assembly is provided. The rotor includes a disk that includes a plurality of circumferentially-spaced blade root slots defined therein, and a plurality of blades wherein each blade includes a root, a tip, and an airfoil therebetween, and wherein each blade is positioned within a pre-determined slot based on a blade map. The blade map is generated by a computer system configured to receive a moment weight value for each blade, receive a geometric parameter value for each blade, and determine a blade map based on the moment weight value and the geometric parameter value.

In yet another aspect, a computer system including a software product code segment for minimizing imbalance in a bladed rotor is provided. The segment is configured to receive a moment weight value for each blade to be installed in the rotor, receive a geometric parameter value for each blade to be installed in the rotor, calculate a blade location on the rotor based on the received values, and generate a blade map based on the calculated location.

DETAILED DESCRIPTION OF THE INVENTION

Figure 1:
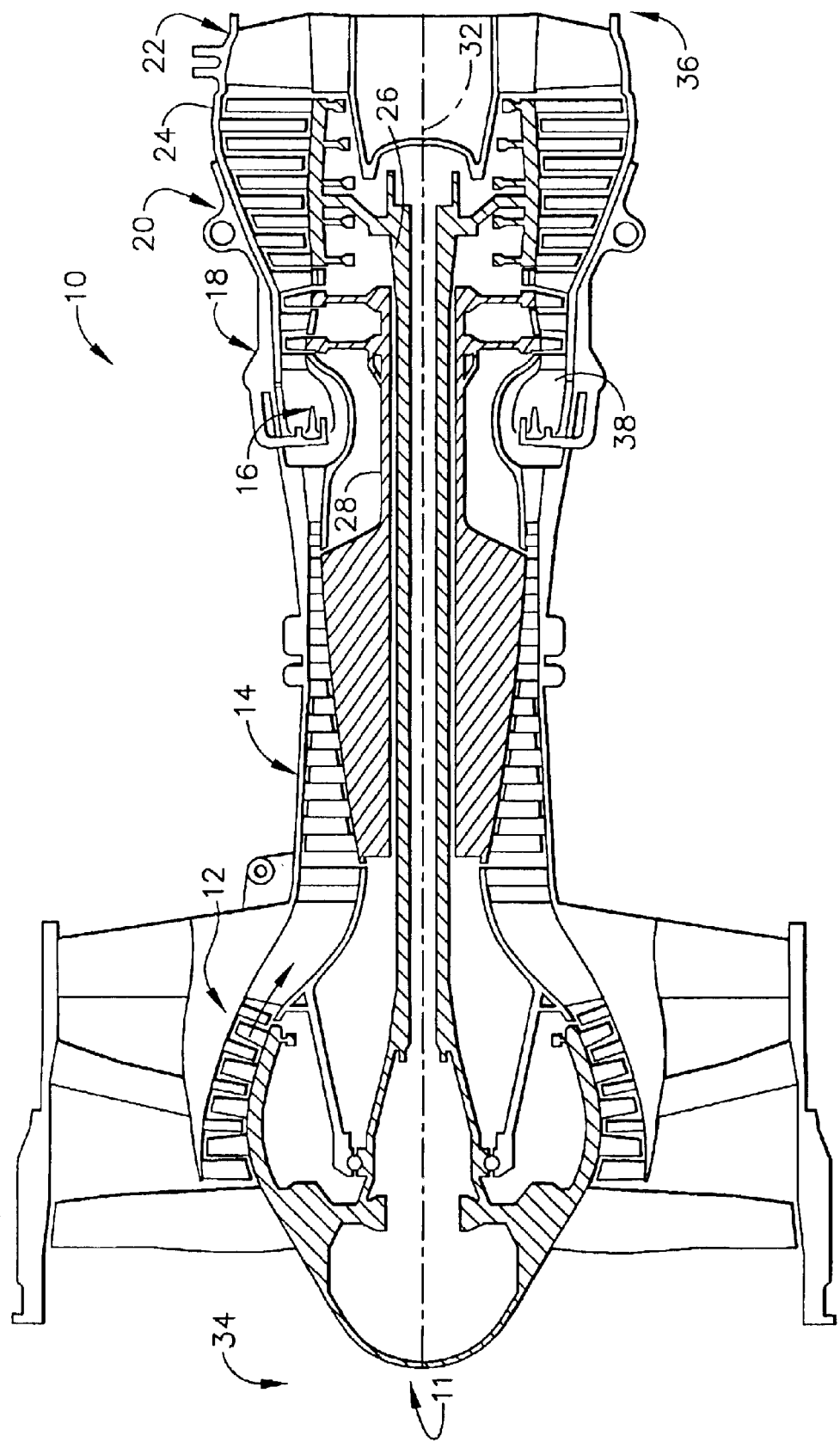
FIG. 1 is a schematic illustration of an exemplary gas turbine engine.

FIG. 1 is a schematic illustration of an exemplary gas turbine engine 10 including a rotor 11 that includes a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. In one embodiment, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases 38 from combustor 16 propel turbines 18 and 20. High pressure turbine 18 rotates second shaft 28 and high pressure compressor 14, while low pressure turbine 20 rotates first shaft 26 and low pressure compressor 12 about axis 32.

Figure 2:
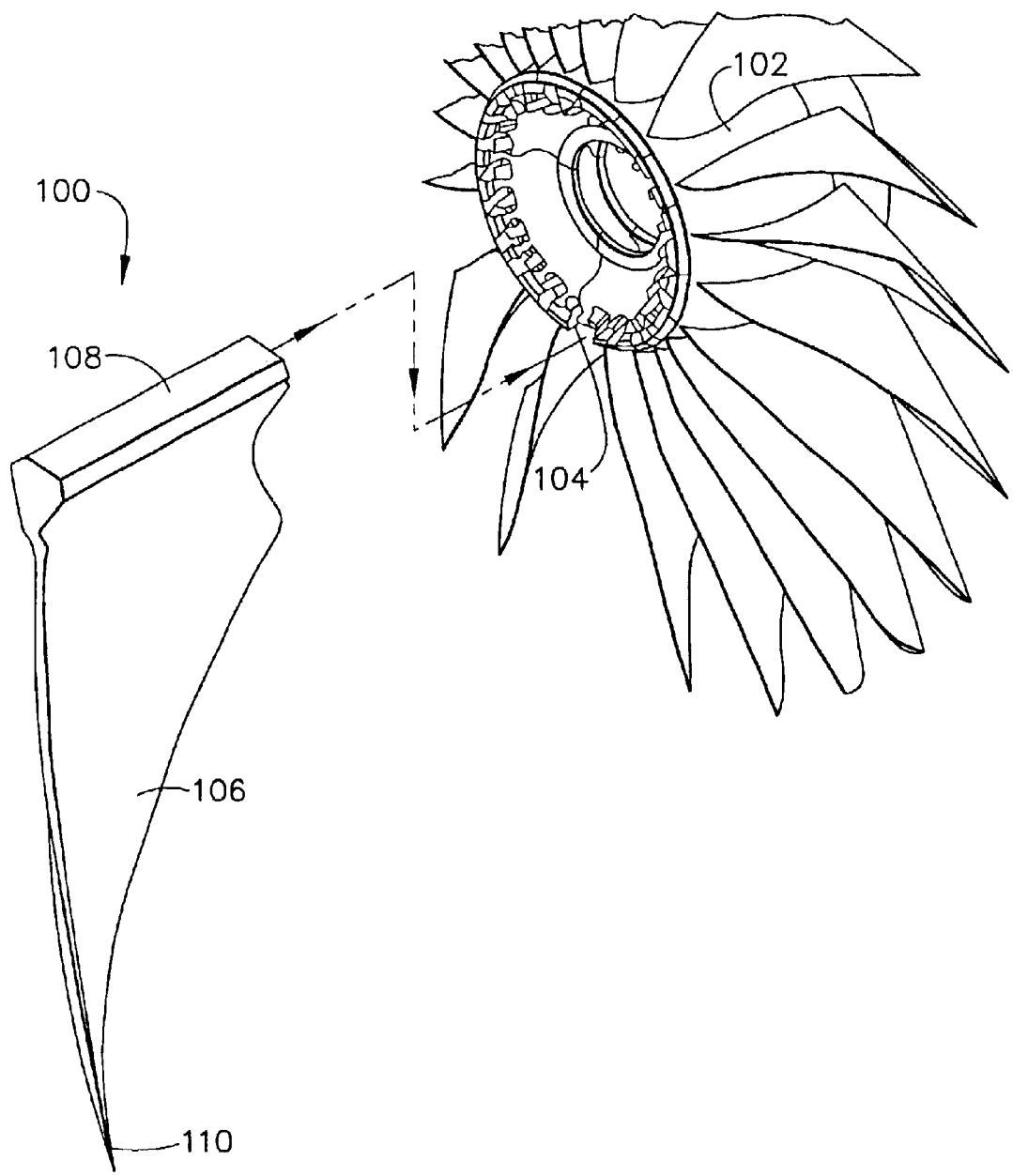
FIG. 2 is a perspective view of an exemplary fan rotor and blading assembly that may be used with the gas turbine engine shown in FIG. 1.

FIG. 2 is an exploded perspective view of an exemplary composite blade 100 and fan rotor disk 102 that may be used with gas turbine engine 10. A plurality of circumferentially-spaced blades 100 are supported by rotor disk or drum 102 through a dovetail slot 104. Each blade 100 includes an airfoil 106 that extends between a dovetail root 108 and a blade tip 110 such that each blade 100 is supported through dovetail root 108 and dovetail slot 104 by rotor 102. Blade 100 is representative of a plurality of circumferentially-spaced blades 100 that are each mapped into a specific slot 104 based on measured parameters of blade 100. In the exemplary embodiment, each blade 100 includes a composite airfoil 106 that includes a plurality of layered composite plies (not shown). More specifically, each blade 100 includes a first plurality of structural and load carrying airfoil plies in airfoil 106 and a second plurality of root plies in root 108.

Figure 3:
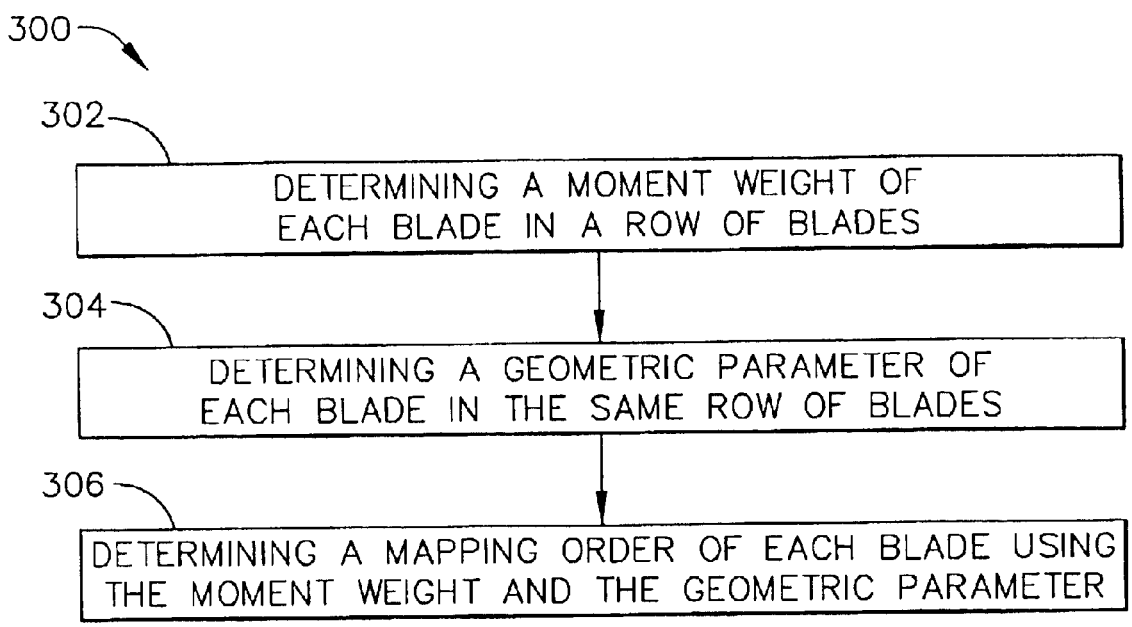
FIG. 3 is a block diagram of an exemplary process that may be used with the fan rotor and blading assembly shown in FIG. 2.

FIG. 3 is a flow diagram of an exemplary method 300 for assembling a rotatable machine such as turbine 10 (shown in FIG. 1). In the exemplary embodiment, the machine is a gas turbine engine that includes a rotor such as rotor 11, shown in FIG. 1, that is rotatable about a longitudinal axis of symmetry of the engine. The rotor includes circumferentially-spaced slots for receiving the blades such that the blades extend radially between a blade root and a blade tip from the slots.

Method 300 includes determining 302 a moment weight of each blade that will be installed in the rotor. The moment weight may be determined by horizontally supporting a blade by its root in a device designed to measure moment weight. A moment weight is based not only on a pan weight of the blade but, also is based on a distribution of the weight of the blade along a radial distance extending between the blade root to the blade tip. In a rotating machine, an uneven distribution of moment weight of each blade spaced about the rotor may affect a balance condition of the rotor.

Some known rotors may experience a sudden shift in fan imbalance at high rotational speeds. Depending on the rotor, such a shift may occur at a certain fan corrected speed and may be associated with blade-to-blade airfoil geometry differences and/or aerodynamic balance. Specifically, the sudden shift in fan imbalance at high rotational speeds may adversely affect engine operation. Over time, a vibration caused by such imbalance may prematurely wear components within the engine and cause increased maintenance requirements. To facilitate minimizing imbalance due to the affects of blade-to blade airfoil differences, a measurement of the geometric parameter of each blade to be installed in the rotor is determined 304. In the exemplary embodiment, such measurements are made directly during rotor assembly. In an alternative embodiment, the measurements may be made indirectly through the use of measurement devices that include sensors that detect and/or infer parameters of the blade. In another alternative embodiment, measurements of geometric parameters of a blade may be made post-assembly during a test phase.

Prior to positioning blades onto the rotor disk, a mapping order is determined 306. A mapping order indicates a specific slot for each blade that will be assembled into the rotor. To determine 306 a mapping order, or blade map, a vector sum of the moment weight values and a vector sum of the geometric parameter values of each blade are combined. In the exemplary embodiment, blades are selected and mapped to a rotor slot that facilitates minimizing the vector sums of moment weight and aerodynamic or geometric parameters with each blade being evaluated individually for a particular slot position. In an alternative embodiment, the blades are selected based on the combination of the vector sums to provide offsetting corrections for each pair of blades positioned 180° apart on the rotor disk. Additionally, blades with offsetting aerodynamic or geometric parameters may be positioned adjacent to blades that have complementary aerodynamic or geometric parameters, to facilitate reducing undesirable shifts in balance due to high rotational speeds. Furthermore, aerodynamic or geometric parameters of blades that may aggravate a shift in balance may be positioned farther apart on the rotor disk to facilitate mitigating such effects. To facilitate determining 306 a mapping order, a computer including a program code segment configured to select and deselect blades may be utilized. Specifically, when blades are selected in complementary pairs, a first blade may be selected for positioning in a specific slot based on moment weight and aerodynamic or geometric parameters. A complementary second blade may then be selected for a slot located 180° apart from the first blade. The computer program iteratively selects the available blades in turn and matches them with complementary blades that will be positioned 180° apart from each selected blade. The computer selects blades in an order that facilitates minimizing a combination of the vector sum of the moment weight of all the blades to be positioned on the rotor disk and the vector sum of the geometric parameters of all blades to be positioned on the rotor disk. During the process of minimizing the combination of the vector sums, it may be necessary to deselect blades from blade pairs and reorder the blades selected. The computer system may then display the resultant blade map and generate a report detailing the selection process. Additionally, manual entry of blade parameters and recalculation of the blade map are supported.

Figure 4:
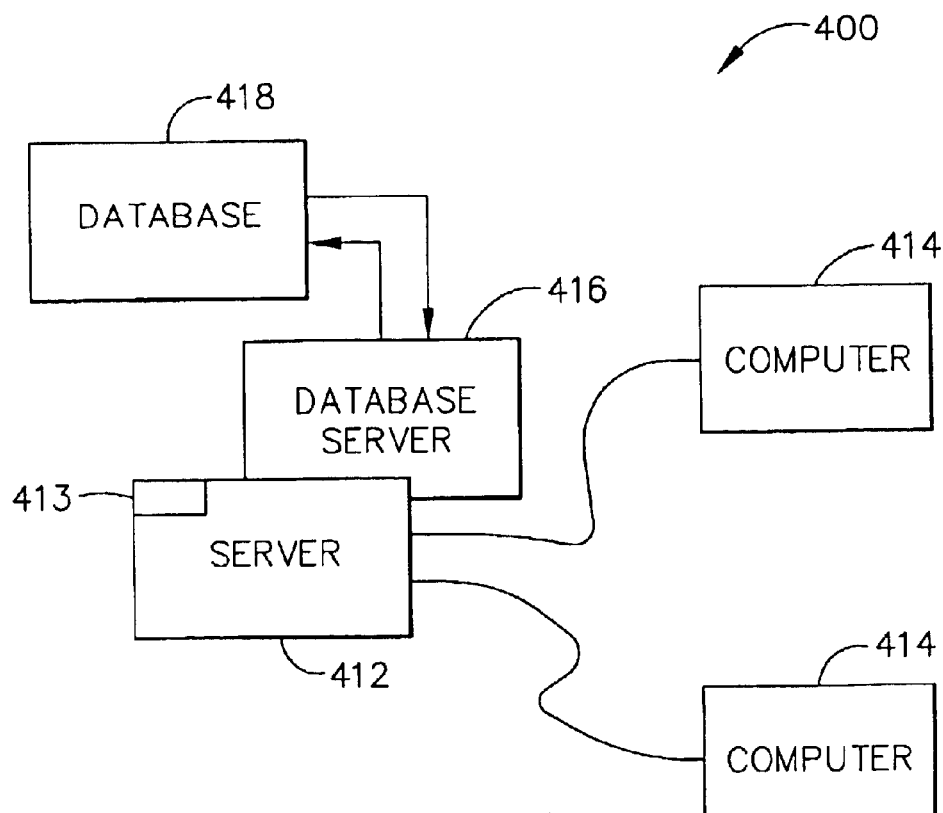
FIG. 4 is a simplified block diagram of an exemplary blade mapping computer system.

FIG. 4 is a simplified block diagram of a blade mapping computer system 400. As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". Computer system 400 includes a server system 412 including a disk storage unit 413 for data storage, and a plurality of client sub-systems, also referred to as client systems 414, connected to server system 412. In one embodiment, client systems 414 are computers including a web browser, such that server system 412 is accessible to client systems 414 via the Internet. Client systems 414 are interconnected to the Internet through many interfaces including a network, such as a local area network (LAN) or a wide area network (WAN), dial-in-connections, cable modems and special high-speed ISDN lines. Client systems 414 could be any device capable of interconnecting to the Internet including a web-based phone, personal digital assistant (PDA), or other web-based connectable equipment. A database server 416 is connected to a database 418 containing information regarding engine components. In one embodiment, centralized database 418 is stored on server system 412 and can be accessed by potential users at one of client systems 414 by logging onto server system 412 through one of client systems 414. In an alternative embodiment database 418 is stored remotely from server system 412 and may be non-centralized.

The above-described blade mapping system is cost-effective and highly reliable means for determining a blade map using more than one blade parameter to facilitate assembling a rotatable machine. Each system is configured to receive a moment weight value for each blade, receive a geometric parameter value for each blade, calculate a blade location on the rotor based on the received values, and generate a blade map based on the calculated location. Accordingly, the blade mapping system facilitates assembly, operation, and maintenance of machines, and in particular gas turbine engines, in a cost-effective and reliable manner.

Exemplary embodiments of blade mapping system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A method of assembling a rotatable machine that includes a plurality of blades that extend radially outwardly from a rotor, said method comprising:

determining a moment weight of each blade in a row of blades;

determining a geometric parameter of each blade in the same row of blades; and determining a mapping order of each blade using the moment weight and the geometric parameter.

2. A method in accordance with claim 1 wherein determining a mapping order comprises determining a moment weight vector sum of the rotor.

3. A method in accordance with claim 1 wherein determining a mapping order comprises determining a geometric parameter vector sum of the rotor.

4. A method in accordance with claim 1 wherein determining a mapping order comprises using a computer to determine a slot position defined within the rotor for each blade that facilitates minimizing a moment weight vector sum, and a geometric parameter vector sum of the rotor.

5. A method in accordance with claim 1 further comprising positioning each blade in a respective slot defined in the rotor using the determined mapping order.

6. A method in accordance with claim 1 wherein determining a geometric parameter comprises determining an aerodynamic balance of each blade.

7. A rotor assembly comprising:

a disk comprising a plurality of circumferentially-spaced blade root slots defined therein; and a plurality of blades, each said blade comprising a root, a tip, and an airfoil therebetween, each said blade positioned within a pre-determined slot based on a blade map, said blade map generated by a computer system configured to:

receive a moment weight value for each blade;

receive a geometric parameter value for each blade; and determine a blade map based on the moment weight value and the geometric parameter value.

8. A rotor assembly in accordance with claim 7 wherein the geometric parameter is an aerodynamic balance of each blade.

9. A rotor assembly in accordance with claim 7 wherein said plurality of blades are composite fan blades.

10. A rotor assembly in accordance with claim 7 wherein said computer system is further configured to calculate a moment weight vector sum of said rotor using the moment weight value received for each blade.

11. A rotor assembly in accordance with claim 10 wherein said computer system is further configured to facilitate minimizing a moment weight vector sum of said rotor using the moment weight value received for each blade.

12. A rotor assembly in accordance with claim 7 wherein said computer system is further configured to calculate a geometric parameter vector sum of said rotor using the geometric parameter value received for each blade.

13. A rotor assembly in accordance with claim 12 wherein said computer system is further configured to facilitate minimizing a geometric parameter vector sum of said rotor using the geometric parameter value received for each blade.

14. A rotor assembly in accordance with claim 7 wherein said computer system is further configured to determine a blade map for the rotor based on a calculated moment weight vector sum and a calculated geometric parameter vector sum wherein said map indicates a one-to-one correspondence between each said blade and each said slot.

15. A computer system comprising a software product code segment for minimizing imbalance in a bladed rotor, said segment configured to:

receive a moment weight value for each blade to be installed in said rotor;

receive a geometric parameter value for each blade to be installed in said rotor;

calculate a blade location on said rotor based on the received values; and generate a blade map based on the calculated location.

16. A computer system in accordance with claim 15 wherein the geometric parameter is an aerodynamic balance.

17. A computer system in accordance with claim 15 wherein said software product code segment is configured to calculate a moment weight vector sum using the moment weight value received for each blade.

18. A computer system in accordance with claim 15 wherein said software product code segment is configured to calculate a geometric parameter vector sum using the geometric parameter value received for each blade.

19. A computer system in accordance with claim 15 wherein said software product code segment is configured to minimize a combination of a moment weight vector sum and a geometric parameter vector sum in said rotor.

20. A computer system in accordance with claim 15 wherein said software product code segment is configured to generate a blade map that maps each blade into a respective rotor slot to facilitate minimizing a combination of a moment weight vector sum and a geometric parameter vector sum in said rotor.

* * * * *